United States Patent
Unger

(10) Patent No.: US 8,882,470 B2
(45) Date of Patent: Nov. 11, 2014

(54) ROTOR FOR A WIND POWER GENERATOR

(76) Inventor: Fritz Unger, Hannover (DE)

(*) Notice: Subject to any disclaimer, the term of this patent is extended or adjusted under 35 U.S.C. 154(b) by 575 days.

(21) Appl. No.: 13/181,028

(22) Filed: Jul. 12, 2011

(65) Prior Publication Data

US 2012/0177502 A1    Jul. 12, 2012

(30) Foreign Application Priority Data

Jan. 7, 2011  (DE) ............... 20 2011 001 101 U
Jan. 13, 2011 (DE) ............... 20 2011 001 452 U

(51) Int. Cl.
*F03D 11/00* (2006.01)
*F03D 1/06* (2006.01)

(52) U.S. Cl.
CPC .......... *F03D 1/0633* (2013.01); *Y02E 10/721* (2013.01)
USPC ............................ 416/243; 416/228; 416/237

(58) Field of Classification Search
CPC .... F03D 1/0675; F03D 1/0683; Y10S 416/03
USPC .................. 416/228, 237, 243, DIG. 3
See application file for complete search history.

(56) References Cited

U.S. PATENT DOCUMENTS

| | | | | |
|---|---|---|---|---|
| 1,818,607 A | * | 8/1931 | Campbell ................. | 416/237 |
| 5,052,892 A | * | 10/1991 | Fasano .................... | 416/204 R |
| 5,904,423 A | * | 5/1999 | Forschner et al. ........ | 366/317 |
| 6,616,411 B2 | * | 9/2003 | Sheidler et al. .......... | 416/237 |
| 8,220,986 B2 | * | 7/2012 | Janz et al. ................ | 366/330.3 |

FOREIGN PATENT DOCUMENTS

| | | |
|---|---|---|
| DE | 605 663 | 10/1934 |
| DE | 29 28 764 | 6/1981 |
| DE | 44 01 781 | 7/1995 |
| GB | 2 237 254 A | 10/1989 |
| WO | WO 2004-092009 | 10/2004 |

* cited by examiner

*Primary Examiner* — Ninh H Nguyen
(74) *Attorney, Agent, or Firm* — Greer, Burns & Crain, Ltd.

(57) ABSTRACT

A rotor according to a preferred embodiment of the invention has at least one blade arranged at a hub of the rotor, wherein the blade has a curvature between its leading edge and its trailing edge which curvature has a first convex surface and an opposite second concave surface, wherein the first surface is to be arranged against the direction of the wind striking the blades. The convex profile of the first surface and the concave profile of the opposite second surface are spaced by the thickness of the blade which is preferably constant. The hub is arranged at the rotational axis.

26 Claims, 5 Drawing Sheets

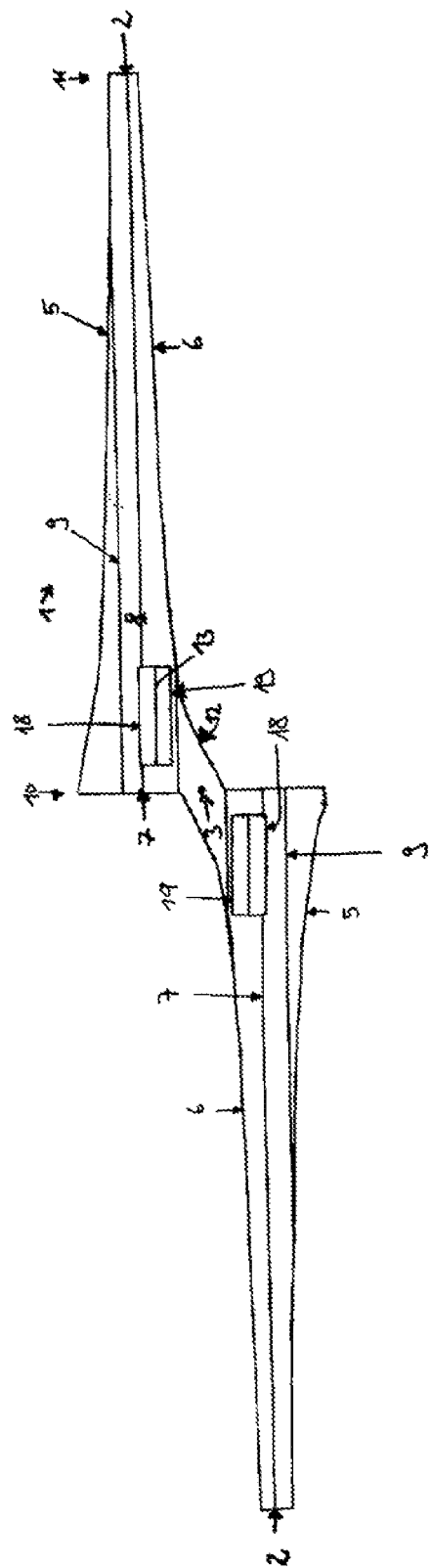

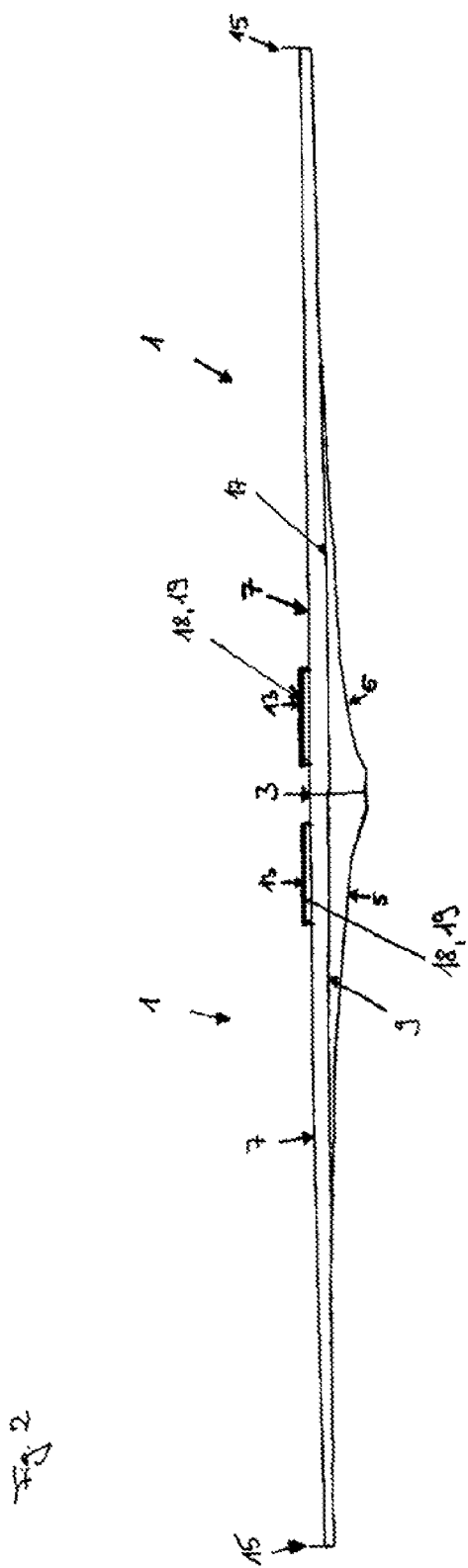

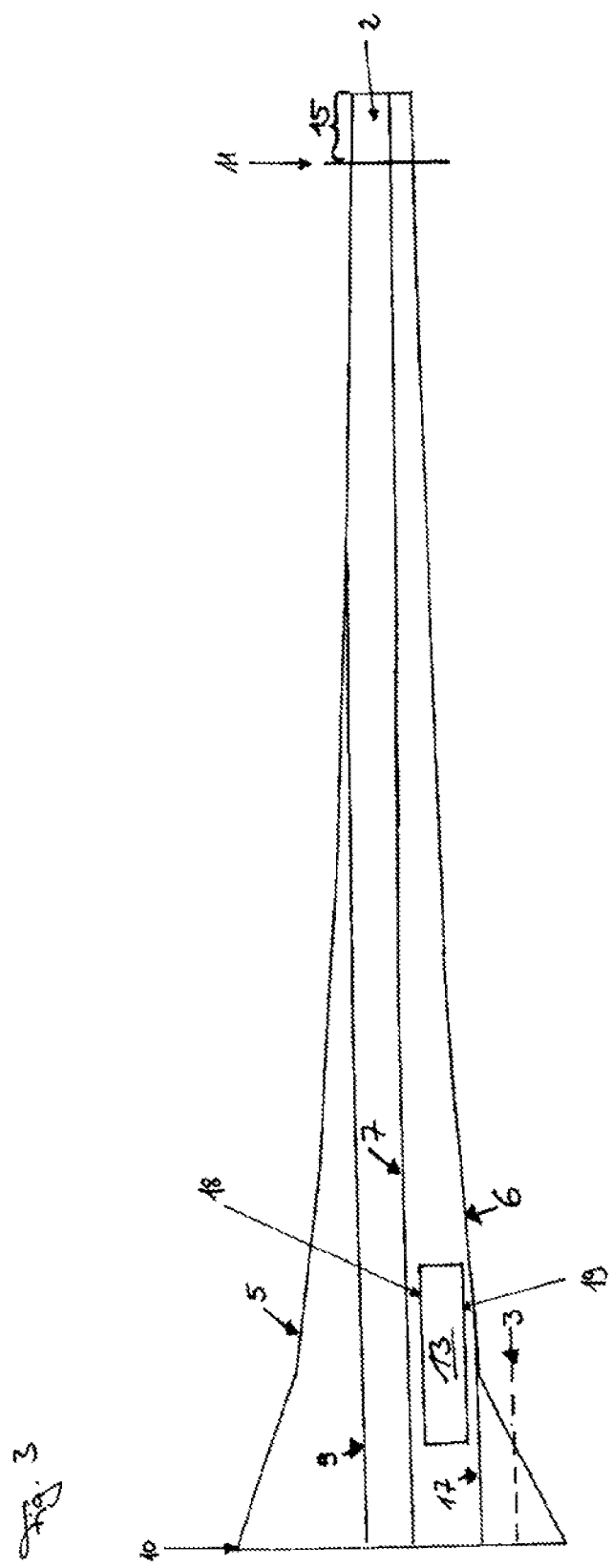

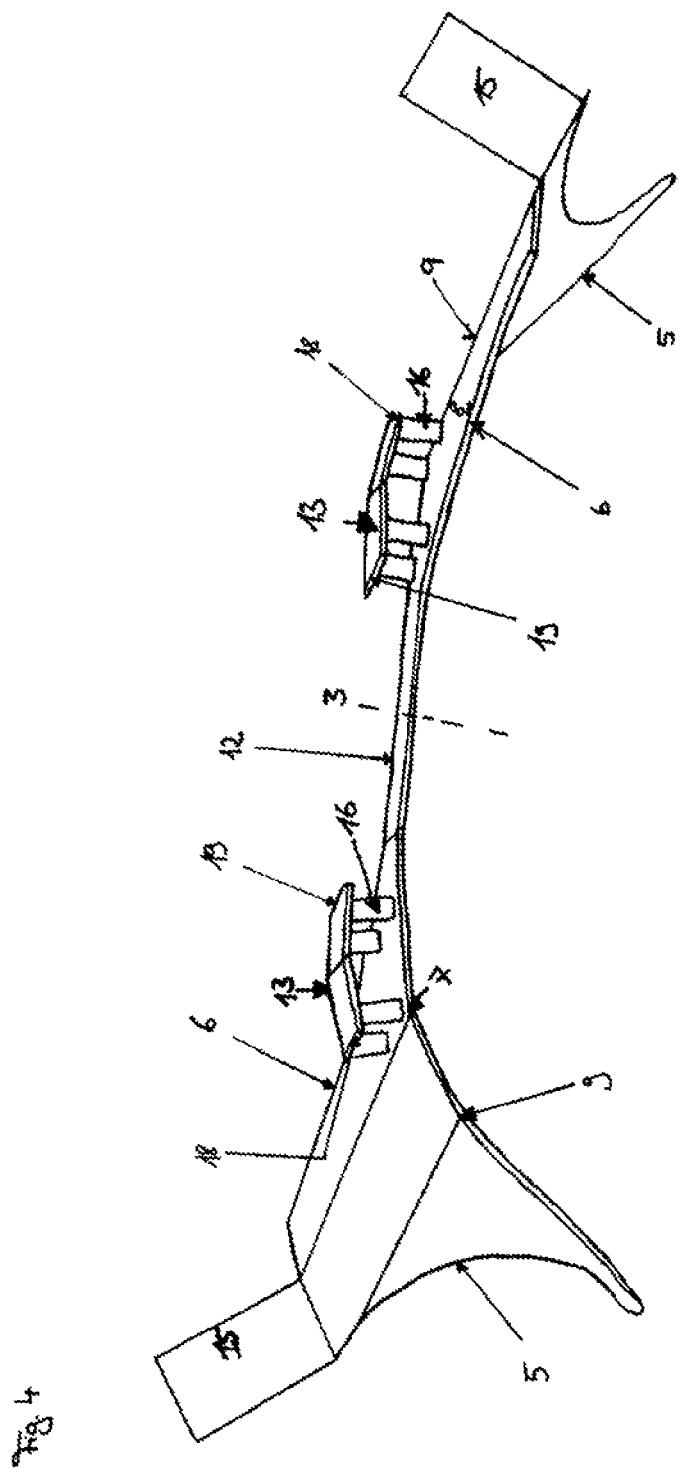

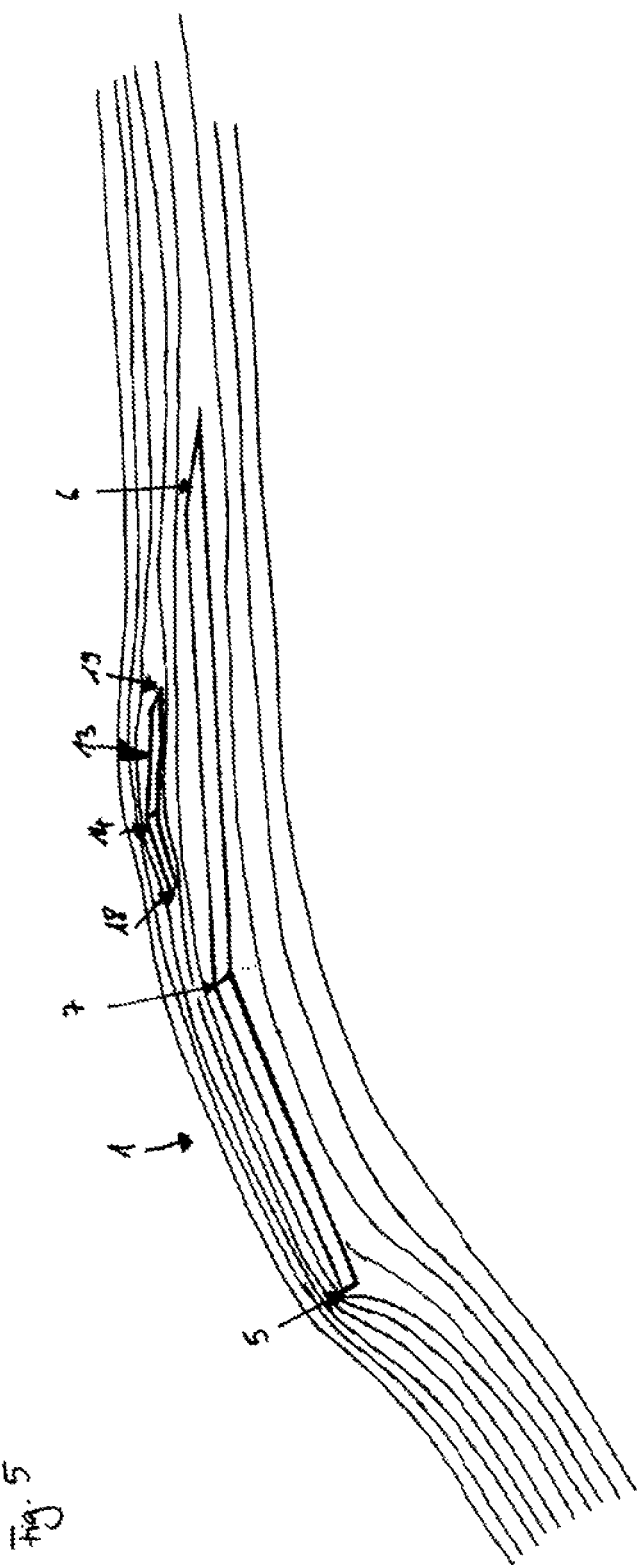

ROTOR FOR A WIND POWER GENERATOR

CLAIM FOR PRIORITY

This application claims priority under 35 U.S.C. §119 from German Utility Model Application number DE 20 2011 001 452.5, filed on Jan. 13, 2011, and from German Utility Model Application number DE 20 2011 001 101.1, filed on Jan. 7, 2011.

FIELD

A field of the invention is wind power generation. The invention concerns rotor for a wind power generator.

BACKGROUND

Known rotors for wind power generators have blades arranged radially to a rotational axis, which blades have a convex first surface facing the incoming wind and an opposite second surface having a planer convex profile which upon rotation is arranged in lee. Such blades have a significant inner volume that is defined by the two opposite convex surfaces, and they require a production process in which these opposite convex surfaces can be produced independently from one another. For adaptation of the profile of both convex surfaces to the local speed of the rotating blades the convex surfaces are usually arranged in a more complanate angle against the surface perpendicular to the rotational axis of the hub with increasing distance from the hub, e.g. from a precipitous positioning at the base of the blade to a flat positioning at the tip of the blade about parallel to a surface perpendicular to the hub.

SUMMARY OF THE INVENTION

A rotor according to a preferred embodiment of the invention has at least one blade arranged at a hub of the rotor, wherein the blade has a curvature between its leading edge and its trailing edge which curvature has a first convex surface and an opposite second concave surface, wherein the first surface is to be arranged against the direction of the wind striking the blades. The convex profile of the first surface and the concave profile of the opposite second surface are spaced by the thickness of the blade which is preferably constant. The hub is arranged at the rotational axis.

SHORT DESCRIPTION OF THE FIGURES

Preferred embodiments are described below with respect to the drawings, of which
a. FIG. 1 is a top view of a preferred embodiment rotor having two blades,
FIG. 2 is a view of the rotor of FIG. 1 turned by about 90°,
FIG. 3 is a top view of a preferred rotor blade,
FIG. 4 is a preferred rotor in perspective view and
FIG. 5 is a sectional view of a blade perpendicular to its longitudinal axis.
In the Figures, identical reference numbers denote functionally equal elements.

LIST OF REFERENCE NUMERALS 1 blade
2 longitudinal axis
3 rotational axis
4 radial
5 leading edge
6 trailing edge
7 apex line
8 first surface
9 second buckling edge
10 base
11 tip
12 connector
13 sheet element
14 apex line or buckling line of the sheet element
15 attachment piece
16 mounting
17 third buckling edge
18 front edge
19 rear edge

DESCRIPTION OF THE PREFERRED EMBODIMENTS

The present invention relates to a rotor for a wind power generator and to a wind power generator comprising such a rotor having a structure and a construction, respectively, that allows its simple production and is distinguished by an effective conversion of the wind energy into rotation and a particularly smooth running behaviour upon oncoming flow along the rotational axis of the rotor. The rotor can be provided with only one blade and can comprise a counterweight arranged symmetrically to the blade, preferably the rotor has two or more blades which are arranged symmetrically and radially to the rotational axis in which the hub is attached. In a preferred embodiment the rotor has two blades, which are arranged opposite each other radially to a common rotational axis. In a preferred embodiment the longitudinal axes of the blades extend to one another at a distance which is covered by a connector, in the middle of which the common rotational axis is arranged. In this embodiment the blades are preferably arranged alongside of spaced apart parallels, and therefore are arranged in an angle against the radial which is generated by their distance, over which angle the connector which is connected with the hub extends. Particularly preferred one blade, more preferred two blades and the spacer connecting these are formed of one single piece, e.g. of a continuous sheet metal or at least a synthetic material. Optionally, each blade has a spaced sheet element. The optional sheet element arranged at each blade increases the advantages of the running properties of the rotor according to the invention. Generally, a hub is arranged in the rotational axis of the rotor which hub is coupled with the generator directly or with interconnected transmission or gearbox. Preferably, the armature of the generator is fastened at the hub of the rotor.

In comparison to known rotors for wind power generators, the invention provides a rotor having a simpler construction and allowing a simpler production process. The rotor of the invention has a high running smoothness and/or allows a conversion of an air movement into rotation of the rotor with approximately as high an efficiency as conventional rotors, or with a higher efficiency.

The rotor according to the invention as it is especially defined by the features of the claims, is distinguished in that it has at least one blade arranged at a hub of the rotor, wherein the blade has a curvature between its leading edge and its trailing edge which curvature has a first convex surface and an opposite second concave surface, wherein the first surface is to be arranged against the direction of the wind striking the blades. The convex profile of the first surface and the concave profile of the opposite second surface are spaced by the thickness of the blade according to the invention and are formed by arrangement of surface sections of the first surface and of the second surface, respectively, along parallel apex lines at the first and second surface, respectively, which are spaced apart by the thickness of the blade. The thickness of the blade is preferably constant and e.g. is formed by the thickness of a sheet from which the blade and the connector are made. The hub is arranged at the rotational axis. Preferably, an apex line of the first surface and an apex line of the second surface is generated by a common buckling edge.

The rotor of the present invention has at least one blade which is arranged at a hub. The at least one blade of the rotor has a leading edge and an opposite trailing edge between which edges a curvature comprising a convex first surface and an opposite second surface which is concave is defined. The convex first surface and the concave second surface are formed by the surface sections along parallel apex lines at the first and the second surface, respectively, which are spaced apart by the thickness of the blade.

In a preferred embodiment the device of the invention consists of a rotor having two blades and a sheet element arranged on top of each blade which blades are connected by a connector extending across the axis of rotation and connecting the blades, preferably the blades and the connector being of one piece, e.g. one sheet metal. The connector preferably is arranged such that its longitudinal axis is approximately perpendicular to the parallel longitudinal axes of the blades.

In a further embodiment the connector is arranged between two blades of the rotor such that its longitudinal axis is not perpendicular to the longitudinal axes of the blades. In this embodiment the connector is arranged between the two spaced parallel blades of the rotor such that the angle between the longitudinal axis of the connector and the longitudinal axis of each blade is about 95 to 170°, preferably 120 to 140°. An apex line of the first surface and an apex line of the second surface of said blades share a common buckling edge. Optionally, a generator which can be coupled with and/or fastened at the hub is arranged at a mounting such that it faces the first surfaces or the second surfaces of the blades, respectively.

This construction of the blade allows a simple production process, since the concave profile of the second surface is determined by the thickness of the blade material, e.g. a sheet metal, and the convex profile of the first surface, such that the blade is thin and has no solid profile between two convex surfaces like conventional rotor blades. The profiles of the first and the second surface are formed by one, two or more buckling edges each running longitudinally to the blade or in a sharp angle, e.g. from 0 to 15 to the longitudinal axis of the blade.

Preferably, the sections of the first and second surfaces adjoining at apex lines in an angle are planar each, such that the first surface and second surface are generated by planar surface sections adjoining angularly at apex lines.

Preferably, the first and the second surfaces are arranged at a distance to one another which is constant over the length and/or constant over the width of the blade. In that, the first and the second surfaces of a blade, especially a single piece rotor having one or more blades and a connector arranged between these, can be made of a material having uniform thickness, e.g. of a sheet metal or of synthetic material having uniform thickness.

Surprisingly, it has been found that a rotor having blades according to the invention has an efficiency that is insignificantly lower in the conversion of wind energy into rotation than a rotor having blades of identical dimension which are convex on both sides.

The blade according to the invention and a single-piece rotor having one or more blades arranged at a connector is producible by forming of a material which especially has a uniform layer thickness. In that a blade and a single-piece rotor, respectively, can be produced by blanking of a sheet metal and subsequent buckling along the at least one buckling line running longitudinally in each blade. Preferably, a sheet metal is an aluminium, steel or titanium sheet, especially having a passivated surface, having an anti-oxidation layer, or consisting of stainless material.

A blade having a convex first surface and an opposite concave second surface which are formed by buckling along a buckling edge, has the advantage that a stiffening of the blade is generated on the one hand by the angular arrangement of the surface sections along the buckling edges, and on the other hand by the hardening and embrittlement, respectively, of the sheet metal by buckling, e.g. upon impressing of a blanked sheet metal having the outline of a blade between a male mould and a female mould.

Alternatively, a blade according to the invention and a single-piece rotor having one or more blades arranged at a connector can be produced by curing of a synthetic material in a negative mould of the blade or of the rotor, especially it can be cast, e.g. injection-moulded.

The generator can be arranged at that side of the rotor facing the first surface. Preferably, the hub of the rotor only extends from that side facing the second surface opposite the first surface, and the generator is coupled with the hub; in this embodiment the hub and/or the generator preferably is arranged at a mounting perpendicular to the hub, and preferably is rotatable around the mounting.

Alternatively, the generator can be arranged at the windward side in front of the rotor which then is in lee. In this arrangement, the convex first surface of the blade face's the generator.

Optionally, the blade has a sheet element arranged at a distance on its first surface extending approximately in parallel to the longitudinal axis of the blade between the trailing edge of the blade and the apex of the convex first surface. Such a sheet element has a front edge arranged at a distance to the first surface and a rear edge opposite the front edge, which rear edge is arranged at a distance to the first surface of the blade. Preferably, both the front edge and the rear edge of the sheet element are in parallel to one another, further preferably they are arranged in parallel to the longitudinal axis of the blade and can be arranged at the same distance or at differing distances to the first surface of the blade. The sheet element can extend in a plane extending essentially in parallel to the section of the first surface of the blade covered by the sheet element. Specifically, the sheet element can be planar, having a convex first surface opposite the first surface of the blade, and e.g. can have at least two surface sections inclined against one another in a buckling edge running approximately in parallel to the longitudinal axis of the blade, wherein the buckling edge has a greater distance to the first surface of the blade than the front edge and/or the rear edge of the sheet element. According to the invention, the sheet element that is spaced from the blade, and the first surface of the blade form a flow channel the cross-section of which flow channel is open and in parallel to the leading edge of the blade, such that upon rotation of the rotor air can stream through the cross-section of the flow channel. Presently, it is assumed that the observed advantageous properties of this embodiment of the rotor are based on the reduction of eddy formation by the flow channel formed between the first surface of the blade and the sheet element in this section between the crown of the convex curvature of the first surface and the trailing edge of the blade.

In this flow channel, the air flow is guided along the first surface such that the air flow is closer to the blade, and laminar, respectively.

The optional sheet element preferably extends over a portion of from 5% to 50%, preferably of 10% to 30% or up to 20% of the length of the blade and in parallel to the longitudinal axis of the blade, and preferably over a portion of from 5% to 50%, preferably of 10% to 30% or up to 20% of the distance between leading edge and trailing edge, especially over a portion of from 20% to 90%, more preferred of 60% to 80% of the distance between the crown of the curvature of the blade and its trailing edge, especially the section of the trailing edge next to the sheet element.

Preferably, the crown of the blade on its first surface is formed by an apex line and a buckling line or buckling edge, respectively, which e.g. runs approximately in parallel to the longitudinal extension of the blade, whereby in the buckling line a surface section adjoining the leading edge and a surface section adjoining the trailing edge meet, e.g. in a flat angle of from about 10° to 30°, preferably at about 20°. Optionally, the surface section between the apex line and the leading edge is formed by at least two partial surfaces, which preferably are planar each and adjoin along a front buckling line in an angle of from e.g. 5° to 30° or up to 20°. Optionally, the surface section between the apex line and the trailing edge can be formed by at least two partial surfaces, which preferably are planar each and adjoin alongside of a rear buckling edge in an angle of from e.g. 5° to 30° or up to 20°.

A blade according to the invention in its convex first surface has at least one, optionally exactly one apex line running essentially longitudinally to the blade and in its opposite concave second surface a parallel apex line spaced by the thickness of the blade, wherein at the apex line of the first surface and at the opposite parallel apex line of the second surface surface sections adjoin in an angle each, e.g. in an angle of from 5° to 60°, preferably of up to 45° or up to 30°, more preferred of 10° to 25°, wherein the surface sections are preferably planar each. This one apex line of the first surface and the parallel apex line of the second surface e.g. are at a distance of from 10% to 90%, preferably at or up to 60%, more preferred at or up to 20% to 50% of the distance between leading edge and trailing edge of the blade, e.g. measured at half of the length of the blade between its base and tip.

Optionally, a blade can have one or more additional apex lines on the first surface and a respective parallel apex line on the second surface, further subdividing the first and the second surfaces into sections which preferably are planar, at which sections the surface sections adjoin one another at an angle. Since the first surface is convex and the opposite second surface is concave in that the surface sections adjoin alongside of one or more apex lines, in embodiments having additional apex lines the adjoining surface sections each are arranged at corresponding angles.

For mounting the sheet element is fastened e.g. by means of perpendicular pins at the first surface of the blade, or by means of planiform carriers which are preferably arranged essentially in perpendicular to the longitudinal dimension of the blade and tangentially to a circle around the rotational axis, respectively, and form a mounting in order to create an as low resistance as possible to the air streaming over the blade. Preferably, the mounting has or consists of two planar plates, strips or sheets arranged at each of the narrow edges of the sheet element, which specifically are of one single piece. The sheet elements are arranged with rotational symmetry to the rotational axis of the rotor and/or in parallel to the apex line of each blade.

In a preferred embodiment the rotor has at least two rotationally symmetrical blades arranged radially to the rotational axis of the rotor or in a parallel stagger to the radial, which blades are connected to each other by a connector, at which connector the rotational axis and the hub, respectively, are arranged, wherein optionally the longitudinal axes of the blades and/or the sections of the first surfaces of the blades adjoining the leading edge or adjoining the trailing edge are arranged perpendicularly to the rotational axis.

The connector can be plate-shaped and can be arranged in the same plane in which the blades extend, especially their leading edges, wherein the trailing edges of the blades are arranged at a distance to the plane in which, due to the curvature of the blades, the leading edges of the blades extend. In a preferred embodiment, two blades of a rotor with their leading edges arranged in a common plane, commonly form a curved profile of their first surfaces, the convex surface of which is facing the striking wind, in that the blades are arranged at a hub symmetrically to one another and to the rotational axis, whereas at the second surface of the blades, which are concave, in the rotational axis a hub and optionally the generator is arranged, especially with its armature at the hub, and further optionally having a transmission or gearbox arranged between hub and armature.

The Figures show preferred embodiments in which the rotor is two-bladed and an optional strip-shaped sheet element 13 having a convex curvature of its first surface is fastened at each blade 1, especially at the convex first surface 8 of each blade 1, wherein the blades 1 and a connector 12 connecting the blades 1 are formed of one single piece, e.g. of sheet metal or of synthetic material which optionally is fiber-reinforced.

In top view of the convex first surface 8 of the blades 1, FIG. 1 shows that the longitudinal axes 2 in which the blades 1 extend from the rotational axis 3 are arranged in parallel to the radial 4 and staggered by a distance. The blades 1 are connected by a connector 12 to which the rotational axis 3 is perpendicular and at which connector a hub (not shown) is arranged. Between the leading edge 5 and the trailing edge 6, at about 50% to 60% of the distance between the leading edge 5 and the trailing edge 6, the apex line and the buckling edge 7, respectively, forming the apex of the convex profile of the first surface 8, run approximately in parallel to the longitudinal axis 2. The section of the first surface 8 extending between the leading edge 5 and the apex line 7 of the convex profile is formed by a planar surface section which e.g. in a flat angle is oblique against the plane perpendicular to the rotational axis 3, wherein this plane is arranged perpendicularly to the rotational axis 3, e.g. this plane is the plane of depiction of FIG. 1. The section between the leading edge 5 and the apex line 7 can be divided by a second buckling edge 9 into two subsections bent against one another. The second buckling edge 9 preferably runs about in parallel or in a sharp angle to the apex line 7. Generally preferred, a blade 1 tapers from its base 10 to the tip 11, wherein particularly preferred the leading edge 5 and the trailing edge 6 run straight or in a bend, especially are concave to the longitudinal axis 2 of the blade 1. The rotor having the two blades 1 arranged at a connector 12 consists of a single-piece sheet metal, especially of aluminium which is blanked and buckled along the buckling lines 7, 9, wherein between connector 12 and blade 1 a bend is formed, and optionally at each end of the blade 11 a winglet is formed by buckling, e.g. to about 90° to the first surface 8.

Each blade 1 has an optional sheet element 13 spaced from its first surface 8 and extending over a section between the apex line 7 and the trailing edge 6. According to the preferred embodiment, the sheet element 13 with its long edge 18, 19 is arranged approximately in parallel to the longitudinal axis 2 of the blade 1 and/or in parallel to the apex line 7. The sheet element 13 preferably is arranged with its short edge about perpendicularly to the longitudinal axis 2 of the blade 1. As depicted in the Figures, the sheet element 13 can have a rectangular perimeter having straight edges, and alternatively it can have curved edges, especially edges running in parallel to the leading edge 5 and the trailing edge 6 of the blade 1, respectively.

The sheet element 13 can have a uniform thickness and is preferably made of one piece. Preferably, the sheet element 13 has a convex surface opposite and facing away from the blade 1, the profile of which surface in perpendicular to the longitudinal axis of the blade 1 especially is arcuate convex or stepped. A stepped convex profile of the surface of the sheet element 13 according to FIG. 1 can be formed by two sectional surfaces which are oblique one against the other, adjoining at an apex line or buckling edge 14 of the sheet element 13, which preferably runs in a sharp angle or in parallel to the longitudinal axis of the blade 1.

FIG. 2 shows the preferred two-bladed rotor of FIG. 1 in a view in which the rotational axis 3 is in the plane of depiction. In accordance with the generally preferred embodiment, the apex lines 7 extend in a common plane, which as generally preferred is perpendicular to the rotational axis 3 of the hub. Since the blades 1 are arranged with rotational symmetry to the rotational axis 3, in this depiction the leading edge 5 of a blade 1 is visible as well as the section of the first surface 8 between the apex line 7 and the leading edge 5, and a portion of the first surface 8 bordering on the trailing edge 6, wherein a second buckling edge 17 is visible which is located between the apex line 7 and the trailing edge 6.

The leading edge 18 and the trailing edge 19 of the sheet element 13, as well as the apex line of its convex surface are arranged approximately in parallel to the covered section of the first surface 8 of the blade 1, such that the sheet element 13 delimits a flow channel in parallel to the first surface 8 of the blade 1. As depicted, the sheet element 13 can generally be spaced by a section of the rotational axis 3 from a section of the first surface 8 of the blade 1 adjoining its apex line 7, such that the sheet element 13 is arranged at a distance to the plane within which the blade 1 extends.

The sheet element 13 is connected to the blade 1 by peripheral pins or plates serving as mountings 16. The mountings 16 preferably are arranged in perpendicular to the first surface 8.

Generally, it is preferred that at the tip of each blade 1 an attachment piece 15 approximately in parallel to the rotational axis 3 is arranged, which is also called winglet. Optionally, the attachment pieces 15 and the blade 1 are made of one single piece.

The leading edge 5 and/or the trailing edge 6 of the blade 1 in FIG. 2 run arcuately to the longitudinal axis 2 of each blade 1. As depicted, the longitudinal axes 2 of the blades 1 of a rotor can be arranged in a common plane which preferably is located perpendicularly to the rotational axis 3.

FIG. 3 shows a schematic top view of a flat material, e.g. a sheet, of which a single-piece blade 1 can consist. At the first surface 8 of the blade 1 an optional sheet element 13 is arranged with a spacing. In this depiction in which the flat material forming an arcuate profile is depicted in one plane the arcuate course and concave course, respectively, of the leading edge 5 and of the trailing edge 6 in respect to the apex line 7 is clearly shown, the arcuate course resulting in a taper of the blade 1 from its base 10 to its tip 11. The apex line 7 generated by a buckling line divides the convex profile of the first surface 8 into a surface section extending to the leading edge 5 and into a further surface section extending to the trailing edge 6. The surface section extending from the apex line 7 to the leading edge 5 according to a preferred embodiment has at least one second buckling edge 9 in parallel to the apex line 7, along which this surface section is bent, e.g. by about 20°. The surface section extending between the apex line 7 and the trailing edge 6 according to a further preferred embodiment has a third buckling edge 17 along which the section adjoining the trailing edge 6 is bent, e.g. by about approximately 7-15°, preferably by about approximately 5°.

As is generally preferred, the sheet element 13 covers a section of the first surface 8, the section extending from a front edge 18 essentially in parallel and optionally with a spacing to the first surface along the apex line 7 to a rear edge 19 running at a distance to the trailing edge 6, which can be in parallel to the front edge 18.

FIG. 4 in a perspective view shows the preferred embodiment in which a two-bladed rotor is formed by two blades 1, which are made of one single piece including the connector 12, each of which blade 1 has a sheet element 13 spaced by mountings 16 from the convex first surface 8 of a blade 1, which sheet element 13 covers a section of the first surface 8 which section is arranged between the apex line 7 of the convex curvature of the first surface 8 and the trailing edge 6. The blades 1 and the connector 12 arranged between these preferably consists of a single-piece sheet metal, at which the elements of surface 13 are mounted by means of the mountings 16. The mountings 16 can be strip-shaped, single-piece extensions of the sheet element 13 which can also consist of metal. Alternatively, the sheet element 13 can consist of synthetic material. The mountings 16 at their end opposite the sheet element 13 can be connected to the blade 1 e.g. by clamping, threaded joint, glueing or welding.

The convex first surface 8 and the opposite second surface are spaced from one another by the essentially uniform thickness of the blade 1, such that the apex lines of the first surface 8 and of the second surface running in parallel are formed by buckling edges along which planar surface sections adjoin angularly. Therefore, in this embodiment, too, as generally preferred, the concave second surface is arranged in parallel to the first surface 8 and spaced from that first surface 8 by the uniform thickness of the flat material, which especially is a sheet metal.

FIG. 5 shows a blade 1 having uniform thickness, e.g. of sheet metal, in a sectional view in perpendicular to the longitudinal axis of the blade 1 in the area in which the optional sheet element 13 covers a section between the apex line 7 and the trailing edge 6. The front edge 18 and the rear edge 19 of the sheet element 13 generally are each arranged in parallel to the covered first surface 8 and, as particularly preferred, at the same spacing from the first surface 8. The sheet element 13 has a convex profile which is formed by the apex line 14 which is approximately in parallel to the longitudinal axis 2 and/or to the apex line 7 of the blade 1, at which apex line 14 the sections of the sheet element 13 adjoin at an angle. The sheet element 13 has a uniform thickness and can consist e.g. of a sheet, preferably having single-piece mountings 16, which are not shown here.

The streamlines schematically shown on both sides of the blade 1 and on the sheet element 13, respectively, make clear that the profile of the blade 1 produced by buckling of a flat material allows a tightly adjoining flow, i.e. a laminar flow from the leading edge 5 to the trailing edge 6, and that in particular the sheet element 13 causes a laminar flow over the blade 1. As apparent from this Figure, the sheet element 13 generally can extend over a portion of from ¼ to ½ of the distance that is between the apex line 7 and the trailing edge 6 of the blade 1. Optionally, the front edge 18 of the sheet element 13 can be arranged directly above the apex line 7 of the blade 1 or at a spacing from ⅙ to ¼ of the distance that is between the apex line 7 and the trailing edge 6 of the blade 1.

As generally preferred, the leading edge 5 and/or the trailing edge 6 are provided with a chamfer.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A rotor for a wind power generator having at least one blade rotatable around a rotational axis, which blade has a first surface between a leading edge and a trailing edge, which surface in perpendicular to the longitudinal axis of the blade has a convex profile having an apex line extending approximately in parallel to the longitudinal axis of the blade, wherein at the apex line surface sections of the first surface adjoin in an angle and the opposite second surface is concave in that surface sections of the second surface adjoin in an angle along an apex line of the second surface in parallel to the apex line of the first surface, wherein the surface section of the blade extending between the apex line of the first surface and the trailing edge has a third buckling edge along which a planar surface section adjoining at the trailing edge is bent by about 5°.

2. The rotor according to claim 1, wherein the second surface is in parallel to the first surface and the surface sections of the first surface adjoining at the apex line and the surface sections of the second surface adjoining at the apex line of the second surface each are planar.

3. The rotor according to claim 1, wherein the surface section extending from the apex line to the leading edge of the blade has at least one second buckling edge in parallel to the apex line of the first surface, along which the adjoining surface sections are arranged at an angle of at least 20°.

4. The rotor according to claim 1, wherein the first surface and the parallel second surface are sub-divided into planar surface sections each adjoining at parallel apex lines each, wherein the apex lines consist of a buckling edge, forming the apex line of the first surface running in parallel to the longitudinal axis of the blade, and a further buckling edge forming a second apex line and/or a third buckling edge forming a third apex line.

5. The rotor according to claim 1, wherein the profile of the blade consists of planar surface sections adjoining at apex lines at an angle, which apex lines consist of exactly one buckling edge or two or three parallel buckling edges.

6. The rotor according to claim 1, wherein the blade is formed of a sheet metal or of a synthetic material having uniform thickness.

7. A rotor for a wind power generator having at least one blade rotatable around a rotational axis, which blade has a first surface between a leading edge and a trailing edge, which surface in perpendicular to the longitudinal axis of the blade has a convex profile having an apex line extending approximately in parallel to the longitudinal axis of the blade, wherein at the apex line surface sections of the first surface adjoin in an angle and the opposite second surface is concave in that surface sections of the second surface adjoin in an angle along an apex line of the second surface in parallel to the apex line of the first surface, wherein the rotor has two blades, the longitudinal axes of which blades run in parallel and at a distance to the radial of the rotational axis of the rotor.

8. A rotor for a wind power generator having at least one blade rotatable around a rotational axis, which blade has a first surface between a leading edge and a trailing edge, which surface in perpendicular to the longitudinal axis of the blade has a convex profile having an apex line extending approximately in parallel to the longitudinal axis of the blade, wherein at the apex line surface sections of the first surface adjoin in an angle and the opposite second surface is concave in that surface sections of the second surface adjoin in an angle along an apex line of the second surface in parallel to the apex line of the first surface, wherein the rotor has at least two blades, the longitudinal axes of which are arranged perpendicularly to the rotational axis of the rotor, in planes spaced from one another along the rotational axis.

9. A rotor for a wind power generator having at least two blades arranged rotatably to a rotational axis, which blades have a first surface between a leading edge and a trailing edge, the first surface having a convex profile in perpendicular to the longitudinal axis of the blades generated by an apex line extending approximately parallel to the longitudinal axis of each of the blades, wherein surface sections of the first surface adjoin at the apex line in an angle, and the opposite second surface is concave by surface sections of the second surface adjoining in an angle along an apex line of the second surface running in parallel to the apex line of the first surface, and wherein the longitudinal axis of each blade is in parallel and in a spacing from the radial extending from the rotational axis, and the blades and a connector arranged between the blades are made of one piece, and a hub is arranged in the rotational axis at the connector.

10. The rotor according to claim 9, wherein the longitudinal axes of the blades are arranged in a common plane that is perpendicular to the rotational axis of the rotor.

11. The rotor according to claim 9, wherein the blade at its tip has a plane extension piece arranged in angle of from 60° to 90° in respect to the longitudinal axis of the blade.

12. The rotor according to claim 9, wherein a sheet element is mounted at a spacing from the first surface of the blade.

13. The rotor according to claim 12, wherein the sheet element consists of a material having uniform thickness.

14. The rotor according to claim 12, wherein the sheet element covers a section of the first surface which is arranged between the apex line of the first surface and its trailing edge.

15. The rotor according to claim 12, wherein the sheet element has a front edge facing the leading edge of the blade and a rear edge facing the trailing edge of the blade, wherein both the front edge and the rear edge are arranged approximately in parallel to the first surface.

16. The rotor according to claim 12, wherein the front edge and the rear edge of the sheet element are arranged with the same spacing from the first surface.

17. The rotor according to claim 12, wherein the surface of the sheet element opposite the first surface is convex along an apex line which extends about in parallel to the longitudinal axis of the blade, wherein a planar surface section adjoining the leading edge of the blade and a planar surface section adjoining the trailing edge of the blade adjoin in the apex line at an angle.

18. The rotor according to claim 12, wherein the sheet element extends over a portion of from 5% to 50% of the length of the blade.

19. The rotor according to claim 12, wherein the sheet element extends over a portion of from 10% to 30% of the length of the blade.

20. The rotor according to claim 12, wherein the sheet element extends over a portion of from 60% to 80% of the distance between the apex line of the blade and its trailing edge.

21. The rotor according to claim 12, wherein the sheet element extends over a portion of from 20% to 50% of the distance between the apex line of the blade and its trailing edge.

22. The rotor according to claim 12, wherein the sheet element extends in parallel to the longitudinal axis of the blade.

23. A wind energy generator having a generator arranged at a rotatably positioned hub having a rotor according to claim 9 mounted to the hub.

24. The wind energy generator according to claim 23, wherein the hub extends exclusively from that side of the blades facing the second surfaces of the blades.

25. The wind energy generator according to claim 23, wherein the hub is mounted by a mounting and the hub is rotatable vertically to the longitudinal axis of the mounting.

26. A vehicle having a wind energy generator according to claim 23, wherein the mounting including the wind energy generator is articulated slewably at the vehicle.

* * * * *